United States Patent
Xiong

(10) Patent No.: US 7,917,779 B2
(45) Date of Patent: Mar. 29, 2011

(54) POWER CONTROL APPARATUS FOR MOTHERBOARD

(75) Inventor: Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 631 days.

(21) Appl. No.: 12/036,272

(22) Filed: Feb. 24, 2008

(65) Prior Publication Data
US 2009/0177897 A1 Jul. 9, 2009

(30) Foreign Application Priority Data
Jan. 9, 2008 (CN) .......................... 2008 1 0300059

(51) Int. Cl.
*G06F 1/26* (2006.01)
(52) U.S. Cl. ..................... 713/300; 713/330
(58) Field of Classification Search .................. 713/300, 713/330
See application file for complete search history.

(56) References Cited

U.S. PATENT DOCUMENTS
2008/0203982 A1* 8/2008 Chen et al. .................... 323/266
2009/0106574 A1* 4/2009 Xiong ........................... 713/340
* cited by examiner Primary Examiner — Nitin C Patel
(74) Attorney, Agent, or Firm — Frank R. Niranjan

(57) ABSTRACT

A power control apparatus for automatically turning on and off a motherboard, the power control apparatus includes a power supply supplying electric power to the motherboard periodically, a control circuit including a first switch element, a second switch element, a first capacitor, a second capacitor, a first resistor, and a second resistor. When the power supply is powered up, the second capacitor is charged, the second switch element is turned on, a second terminal of the second switch element outputs a low level signal to power up the motherboard. When the motherboard is powered up, the first capacitor is charged, the first switch element is turned on, the second switch element is turned off, the second terminal of the second switch element outputs a high level signal. The motherboard is powered off when the power supply is powered off.

13 Claims, 1 Drawing Sheet

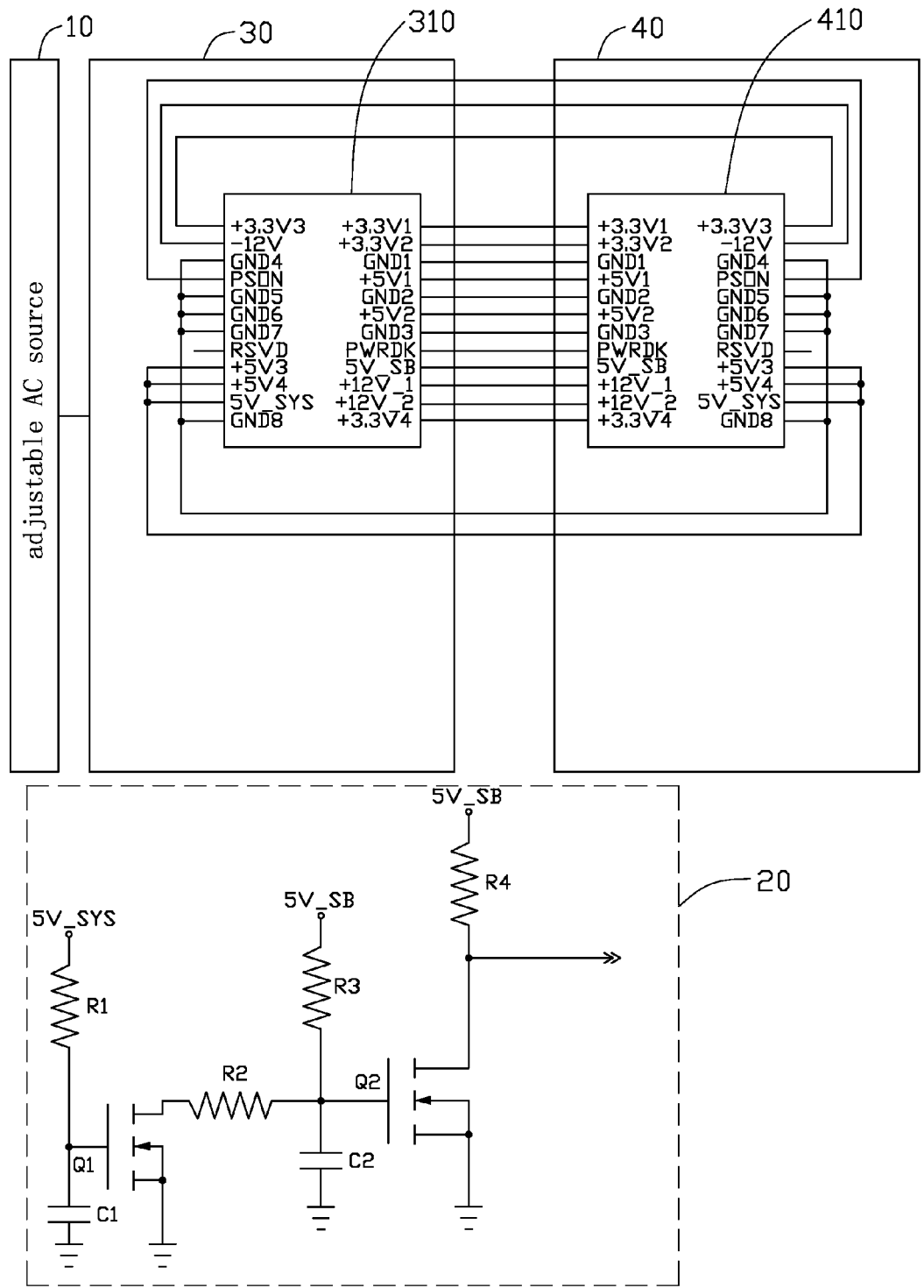

POWER CONTROL APPARATUS FOR MOTHERBOARD

BACKGROUND

1. Field of the Invention

The present invention relates to control apparatuses, and especially relates to a power control apparatus for a computer motherboard.

2. Description of Related Art

In computer systems such as personal computer (PC) systems, operators usually need to press a power button of the PC system to ground a sixth terminal of a computer front panel header, thereby turning on the computer system, which is inconvenient and time consuming for operators manually performing a motherboard test, in which it is common to power up the motherboard a thousand times or more.

What is needed is a simple low-cost power control apparatus for a computer motherboard.

SUMMARY

An exemplary power control apparatus for automatically turning on and off a computer motherboard, the power control apparatus includes a power supply supplying electric power to the motherboard periodically, and a control circuit including a first switch element, a second switch element, a first capacitor, a second capacitor, a first resistor, and a second resistor. When the power supply is powered on, the second capacitor is charged, the second switch element is turned on, a second terminal of the second switch element outputs a low level signal to power up the motherboard. When the motherboard is powered up, the first capacitor is charged, the first switch element is turned on, the second switch element is turned off, the second terminal of the second switch element outputs a high level signal. The motherboard is powered off when the power supply is powered off.

Other novel features and advantages of the present invention will become more apparent from the following detailed description of preferred and exemplary embodiment when taken in conjunction with the accompanying drawing, in which:

BRIEF DESCRIPTION OF THE DRAWINGS

The drawing is a circuit diagram of a power control apparatus for a computer motherboard in accordance with an exemplary embodiment of the present invention.

DETAILED DESCRIPTION

Referring to the drawing, a power control apparatus in accordance with an embodiment of the present invention is provided for controlling on/off of a computer motherboard 40. The power control apparatus includes an adjustable alternating current (AC) source 10 functioning as a power supply connected to an ATX power supply 30 of a computer and to a controlling computer used to control on and off of the AC source 10, and a control circuit 20 connected to the motherboard 40. The AC source 10 is controlled by a software of the controlling computer to periodically turn on and off as determined by a user. The ATX power supply 30 has a 24-pin power connector 310. The motherboard 40 has a 24-pin power connector 410 having a same configuration as the power connector 310. The control circuit 20 includes two switch elements Q1 and Q2, two capacitors C1 and C2, and four resistors R1-R4. Each of the switch elements can be an NMOS transistor, or an NPN transistor. In this embodiment, the switch elements Q1 and Q2 are NMOS transistors.

Pins of the power connector 310 are correspondingly connected to pins of the power connector 40. The gate of the transistor Q1 is connected to a 5V system power pin 5V_SYS of the power connector 410 via the resistor R1, and grounded via the capacitor C1. The gate of the transistor Q2 is connected to the drain of the transistor Q1 via the transistor R2, connected to a 5V standby power pin 5V_SB of the power connector 410 via the resistor R3, and grounded via the capacitor C2. The drain of the transistor Q2 is connected to the 5V standby power pin 5V_SB via the resistor R4, and is also connected to a sixth terminal (not shown) of a computer front panel header (not shown) on the motherboard 40, which powers up the motherboard 40 when grounded. The emitters of the transistors Q1 and Q2 are both grounded.

In use, the adjustable AC source 10 is repeatedly powered on and off in a fixed period, to supply AC voltage to the ATX power supply 30 periodically. The ATX power supply 30 converts the AC voltage into direct current (DC) voltage when the adjustable DC source 10 is powered on. The 5V standby power pin 5V_SB charges the capacitor C2 via the resistor R3. When a voltage of the capacitor C2 is higher than the threshold voltage of the NMOS transistor Q2, the NMOS transistor Q2 is turned on, the drain of the NMOS transistor Q2 outputs a low level signal, the sixth terminal of the computer front panel header receives the low level signal, therefore, the motherboard 40 is powered up.

The 5V system power pin 5V_SYS charges the capacitor C1 via the variable resistor R1 when the motherboard 40 is powered up, when a voltage of the capacitor C1 is higher than the threshold voltage of the NMOS transistor Q1, the NMOS transistor Q1 is turned on, the drain of the NMOS transistor Q1 outputs a low level signal, the capacitor C2 discharges via the resistor R2, when a voltage of the capacitor C2 drops to be less than the threshold voltage of the NMOS transistor Q2, the NMOS transistor Q2 is turned off, the drain of the NMOS transistor Q2 outputs a high level signal, the sixth terminal of the computer front panel header is at a high level, which is a preparation for the motherboard 40 to be powered on again. The motherboard 40 is powered off when the adjustable AC source 10 is powered off by the software, and the capacitor C1 discharges until the motherboard 40 is turned on again when the software powers up the AC source 10 again, and so the cycle continues. Therefore, the motherboard 40 is repeatedly powered on and off for as many times as desired.

The power control apparatus for a motherboard automatically controls the motherboard 40 to power on and off, thereby improving testing efficiency and saving a great deal of manpower.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power control apparatus for automatically turning on and off a computer motherboard, the power control apparatus comprising:
   a power supply supplying electric power to the motherboard periodically; and
   a control circuit comprising:

a first switch element comprising a first terminal connected to a system power pin of the motherboard, and grounded via a first capacitor, a second terminal, and a third terminal grounded;

a second switch element comprising a first terminal connected to the second terminal of the first switch element, a second terminal connected to a power on signal terminal of the motherboard, and a third terminal grounded, the first terminal of the second switch element is connected to a stand-by power pin of the motherboard, and grounded via a second capacitor.

2. The power control apparatus as claimed in claim 1, wherein the power supply is an adjustable alternating current (AC) source.

3. The power control apparatus as claimed in claim 2, wherein the adjustable AC source supplies electric power to the motherboard via an ATX power supply connected between the motherboard and the adjustable AC source.

4. The power control apparatus as claimed in claim 1, wherein the power on signal terminal is a sixth terminal of a computer front panel header on the motherboard.

5. The power control apparatus as claimed in claim 1, wherein each of the first and second switch elements is an NMOS transistor, the first, second, and third terminals are the gate, the drain, and the source of the NMOS transistor respectively.

6. The power control apparatus as claimed in claim 1, wherein each of the first and second switch elements is an NPN transistor, the first, second, and third terminals are the base, the collector, and the emitter of the NPN transistor respectively.

7. The power control apparatus as claimed in claim 1, wherein the system power pin and the standby power pin are 5V system power pin and 5V standby power pin respectively.

8. A power control apparatus for automatically turning on and off a computer motherboard which has a first power connector, the power control apparatus comprising:

an ATX power supply comprising a second power connector having a same configuration with the first power connector;

a power source connected to the ATX power supply;

a control circuit comprising:

a first switch element comprising a first terminal connected to a system power pin of the motherboard, and grounded via a first capacitor, a second terminal, and a third terminal grounded; and a second switch element comprising a first terminal connected to the second terminal of the first switch element, a second terminal connected to a power on signal terminal of the motherboard, and a third terminal grounded, the first terminal of the second switch element is connected to a stand-by power pin of the motherboard, and grounded via a second capacitor, pins of the first power connector and the second power connector are connected correspondingly, and the power source supplying electric power to the motherboard periodically.

9. The power control apparatus as claimed in claim 8, wherein the power source is an AC source.

10. The power control apparatus as claimed in claim 8, wherein the power on signal terminal is a sixth terminal of a computer front panel header on the motherboard.

11. The power control apparatus as claimed in claim 8, wherein each of the first and second switch elements is an NMOS transistor, the first, second, and third terminals are the gate, the drain, and the source of the NMOS transistor respectively.

12. The power control apparatus as claimed in claim 8, wherein each of the first and second switch elements is an NPN transistor, the first, second, and third terminals are the base, the collector, and the emitter of the NPN transistor respectively.

13. The power control apparatus as claimed in claim 8, wherein the system power pin and the standby power pin are 5V system power pin and 5V standby power pin respectively.

\* \* \* \* \*